March 10, 1970 E. N. SCHWARTZ 3,500,351

MAGNETIC RECORDING MEMORY

Filed June 8, 1964

INVENTOR
EDWARD N. SCHWARTZ

BY [signature]

ATTORNEY

United States Patent Office 3,500,351
Patented Mar. 10, 1970

3,500,351

MAGNETIC RECORDING MEMORY

Edward N. Schwartz, Philadelphia, Pa., assignor to Sperry Rand Corporation, New York, N.Y., a corporation of Delaware Filed June 8, 1964, Ser. No. 373,211
Int. Cl. G11b 5/74
U.S. Cl. 340—174 18 Claims

ABSTRACT OF THE DISCLOSURE

A phase modulation writing system is disclosed for recording on a magnetic medium. On a plated wire magnetic coating medium having the property of uniaxial anisotropy, a bi-polar pulse is applied to the wire during the write cycle. This stabilizes the magnetic coating and prevents the creep of information from one bit into an adjacent bit along the wire.

The invention described herein was made in the performance of work under a NASA contract and is subject to the provisions of the National Aeronautics and Space Act of 1958, Public Law 85–568 (72 Stat. 426; 42 U.S.C. 2451), as mended.

This invention relates in general to the recording of information. In particular this invention relates to recording apparatus, which prior to recording an information signal of a certain polarity at a particular position on a recording medium, temporarily pre-records the identical information signal of opposite polarity at the same location.

One of the difficulties encountered in the use of plated magnetic wires (wire substrates plated with a Permalloy film having the property of uniaxial anisotropy) as a recording medium has been that history effects are readily developed therein. History effects may be defined as a permanent set which is developed in a plated magnetic wire by remagnetizing a certain bit location thereon many times in succession in one direction. As a result of successive recording in the same direction, the following effect has been observed; if a certain bit position along the plated wire is successively magnetized as a binary "one" and afterwards it is required to read out this "one" information, a certain magnitude voltage will be detected by an appropriate electronic device. On the other hand, after remagnetizing a certain bit position as a binary "one" over many cycles and afterward the same bit position is magnetized as a binary "zero," then the voltage detected by the above-mentioned circuitry during a read out will not have the same amplitude (opposite polarity) as the read out of the binary "one."

The history effect problem as discussed above is particularly serious in the operation of a digital computer, since the latter functions by using discrete voltage pulses. In the event that these voltage pulses lose amplitude or are not well defined, there is a tendency for the computer to produce spurious results and hence, lose accuracy.

It is therefore an object of the instant invention to provide a new and improved recording apparatus.

It is a further object of the instant invention to provide new and improved recording apparatus which has a simple mode of operation.

It is still a further object of the instant invention to provide a new and improved recording apparatus that minimizes history effects in magnetic thin films.

It is yet a further object of the instant invention to provide recording apparatus to overcome history effects in magnetic thin films which is easily and economically fabricated.

In accordance with a feature of the instant invention, there is provided recording apparatus which never rerecords the same binary information at a particular bit position more than twice in succession. In view of the above-mentioned recording technique, a permanent set of the magnetic substance (the Permalloy film) in one direction is avoided. In other words, by never remagnetizing the magnetic film more than twice in succession, harmful history effects are minimized.

In accordance with a further feature of the instant invention, the technique devised to avoid history effects in plated wires is simply to temporarily pre-record information which is opposite in nature to the information that is to be permanently recorded in a certain bit position. In other words, if a certain bit position is to have a binary "zero" recorded therein, a binary "one" is first temporarily recorded at the same bit location. In like manner, if a certain bit position is to have a binary "one" recorded thereon, a binary "zero" is first temporarily recorded.

The novel features that are considered characteristic of this invention are set forth with particularity in the appended claims. The invention itself, however, both as to its organization and method of operation, as well as additional objects and features thereof, will best be understood from the following description when considered in conjunction with the accompanying drawings, wherein:

Figure 1:
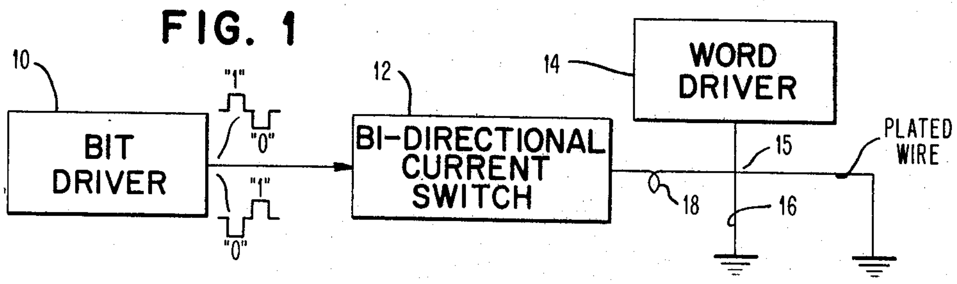
FIGURE 1 is a block diagram of the apparatus which incorporates the recording technique provided by the instant invention.
Figure 3:
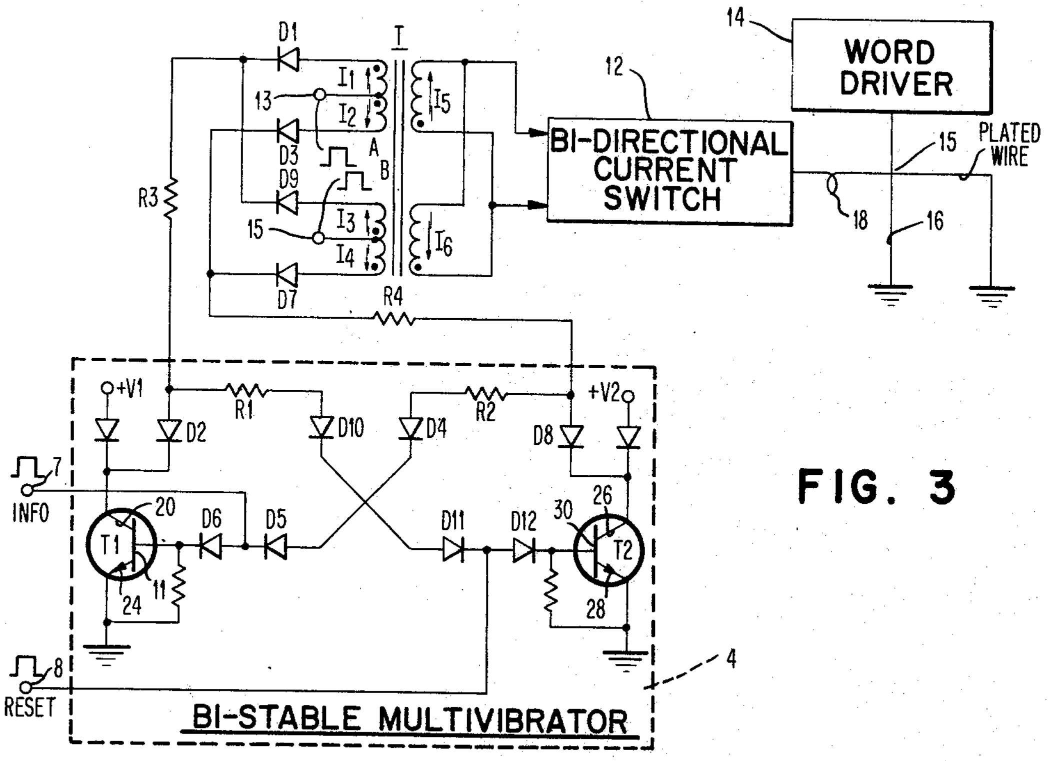
Figure 2:
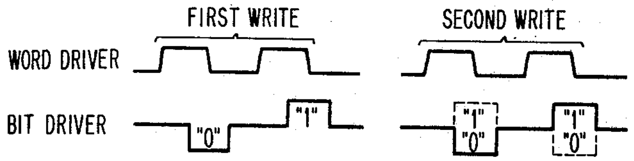
FIGURE 2 depicts the voltage pulses developed by the recording apparatus of FIGURE 1 during a recording cycle.
Figure 2A:
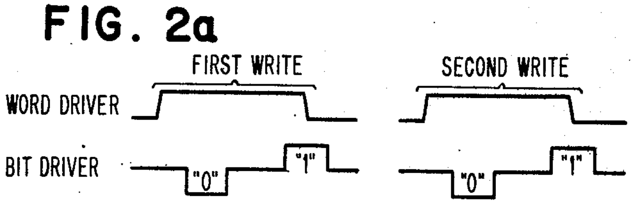

FIGURE 2*a* represents other voltage signals developed by the apparatus of FIGURE 1 in accordance with the technique provided by the instant invention;

FIGURE 3 depicts an actual circuit arrangement to provide the recording technique devised by the instant invention.

Referring now to the drawings, and in particular to FIGURE 1, the magnetic plated wire 18 is shown connected to the bit driver 10 via the be-directional current switch 12. The other end of the plated wire 18 is connected to ground potential. In a preferred embodiment, the plated wire 18 consists of a five mil diameter beryllium copper wire substrate having a thin magnetic film formed on the surface thereof. The thin magnetic film is electroplated on the wire substrate with approximately a ten thousand angstrom thickness of Permalloy (i.e. nickel-iron alloy). The Permalloy film is approximataly 80% nickel and 20% iron. The Permalloy film is electroplated in the presence of a circumferential magnetic field that establishes a uniaxial anisotropy axis at right angles (i.e. around the circumference) to the longitudinal axis of the wire along its length. The uniaxial anisotropy establishes "easy" and "hard" directions of magnetization and the magnetization vectors of the thin film are normally oriented in one of two equilibrum positions along the "easy" axis, thereby establishing the two bistable states necessary for binary logic operation. In other words, at any location along the plated wire, the bit position (i.e. memory element) has two states of stable magnetic remanence, and is adapted to be switched into either of said two states by appropriate circuit means explained in greater detail hereinafter.

In a conventional plated wire memory embodiment, the plated wire 18 serves as a sense line as well as a storage member and is connected by appropriate circuit means to a sense amplifier (not shown in order to effect simplicity and ease of understand in the description). As is well known in the art, a sense amplifier is utilized to read out and interpret information (i.e. whether the information stored is a binary "zero" or binary "one") stored in a particular bit position along the plated wire.

Placed substantially perpendicular and in juxtaposition to the plated wire 18 is a drive line or drive solenoid 16. The intersection of the plated wire 18 and the drive line 16 comprises a bit position or memory element 15. It should be noted that it is not necessary that the drive line 16 be positioned precisely perpendicular to the plated wire 18 and hence, they may be skewed somewhat without seriously degrading the performance. The drive line 16 has a typical width dimension of approximately 20 mils and is connected to an appropriate drive line energizing circuit 14. The drive line 16 may have a single-turn solenoid configuration or as is depicted, may comprise a straight strap one end of which is grounded.

The drive line 16 is energized by the word driver 14 with a signal which is depicted in FIGURE 2 as a double-step unipolar pulse, and is further depicted in FIGURE 2*a* as a single-step unipolar pulse.

Connected to and associated with the plated wire 18 via the bi-directional current switch 12 is the bit driver 10. In order to write or record new binary information into the bit position 15, it is necessary that current be selectively supplied to the plated wire 18 simultaneously with current in the drive line 16. The current in the drive line 16 orients the magnetization vectors from their rest position along the "easy" axis to some angle less than 90 degrees near the "hard" axis of magnetization. The current from the bit driver supplies the additional magnetizing force to rotate the magnetization vectors through the 90 degree "hard" axis position to the new orientation along the "easy" axis, or on the other hand, the bit current steers the magnetization vectors back to the old position along the "easy" axis in the event that no new information is to be recorded. In other words, the presence of the bit current in the plated wire steers (i.e. adds the necessary additional movement) the magnetization vectors toward the desired "easy" axis of orientation. After all bit and drive current is removed, the magnetization vectors relax to a rest position along the "easy" axis as determined by whether a binary "one" or binary "zero" is stored in the bit position 15. The magnitude of the bit current in the plated wire 18 required for the write operation is small in comparison with the drive current in the drive line 16 because the current in the drive line 16 is required to rotate the magnetization vectors to almost 90 degrees from the "easy" axis, and the bit current is only required to steer the magnetization vectors through the 90 degree position.

The pulses emanating from the bit driver 10 are shown in FIGURES 1, 2 and 2*a* to be bi-polar. The indicia applied to each section of the bi-polar pulse in FIGURE 1 refers to the polarity of signal required to produce a bit current which will cause a binary "one" or binary "zero" to be recorded at the bit position 15. As will be explained in more detail hereinafter, if it is required that a binary "zero" be stored at the bit position 15, the bit driver 10 will cause a binary "one" to be temporarily pre-recorded. In a similar manner, if it is required that a binary "one" be recorded at the bit position 15, the bit driver 10 will cause a binary "zero" to be temporarily pre-recorded.

Since current must pass in either direction through the plated wire 18 (i.e. in response to a positive signal from the bit driver 10 to ground potential and from ground potential to the bit driver 10 in response to a negative signal), a bi-directional current switch 12 is employed to transmit this current. Any one of a number of known bi-directional switches may be used but in the preferred embodiment, the bi-directional switch includes PNP and NPN transistors connected to provide a low offset voltage.

The operation of the above-identified bi-directional switch may be summarized briefly as follows: A PNP and an NPN transistor are connected to each other by means of their respective emitters and collector electrodes. The junction of the two connected emitters are further connected to a bit driver and the junction of the two connected collectors are connected to a single plated wire. When therefore it is required that current flow in response to a positive signal emanating from the bit driver in order to record a binary "one" to ground, the PNP transistor is forward biased by a positive signal (concurrent in time with the negative signal applied to the base of the PNP transistor) from the bit driver applied to the junction of the emitter connection; and similarly, when current is to flow from ground in response to the negative signal emanating from the bit driver, in order to record a binary "zero," the NPN transistor is forward biased by a negative signal (concurrent in time with the positive signal applied to the base of the NPN transistor) applied to the junction of the emitter connection. In this manner, it is clear that current can be transmitted in either direction through the plated wire via the bi-directional current switch 12. It should be understood that other bi-directional switches can be used.

The bi-polar pulse emanating from the bit driver 10 is shown in greater detail in FIGURES 2 and 2*a*. In the pulse arrangement under the "first and second write" cycles of FIGURE 2, each section of the bi-polar pulse is shown as being substantially coincident with one of the unipolar pulses produced by the word drive line 14. FIGURE 2*a* depicts the pulse relationship for a "first and second write cycle" wherein only a single unipolar pulse applied to the drive line 16 is substantially coincident with the bi-polar pulse applied by the bit driver 10.

FIGURES 2 and 2*a* depict the basic recording technique of the instant invention wherein if it is required to record a binary "one" in the bit position 15 (FIGURE 1) during a "first or second write cycle," a binary "zero" will first be temporarily pre-recorded in the same memory location.

By observing the operation of the "first and second write" cycles in FIGURES 2 and 2*a*, it can be observed from the last pulse in each cycle that it is required to record a binary "one." On the other hand, if it is required to record a binary "one" in the "first write" cycle and it is further required to write a binary "zero" in the "second write" cycle, then the bi-polar pulse emanating from the bit driver 10 in the "second write" cycle will first be positive and then negative. This operation is depicted in FIGURE 2 where the proper polarity of the pulses for the "second write" cycle are in dotted form. In accordance with this "write cycle," it will be noted that the most times that binary information can be written in succession is twice. In other words, the most times that the same information will be written in succession will occur when it is required to write a binary "one" in a memory location and during a second cycle, it is required to write a binary "zero." At other times, there is no re-recording of information. Thus, when it is required to record a binary "one" followed by another recording of a binary "one," then the recording of a binary "one" in a first cycle will be followed by a pre-recorded binary "zero" in the second cycle. It can therefore be appreciated that history effects in magnetic plated wires can be virtually eliminated in view of the recording techniques above described.

FIGURE 3 depicts a more detailed circuit arrangement to accomplish the recording techniques discussed above with respect to FIGURES 1, 2 and 2*a*. It is to be understood, that the circuitry discussed with regard to FIGURE 3 is deemed exemplary only and other apparatus could be devised in accordance with skill of those in the art. The bit driver 10 (FIGURE 1) which generates a bi-polar pulse comprises a transformer T used in combination with a bistable multivibrator or flip-flop 4 (outlined in dotted form). As is understood in the art, a flip-flop device can assume one of two stable states and when triggered by an input pulse, the circuit switches into a second stable state where it remains until triggered by a second pulse. When the flip-flop is in the first stable state, it is considered to be set whereas when it is in the second stable state, it is said to be reset.

Assuming that it is required to finally record a binary "zero" then the first section of the bi-polar pulse is required to be positive to pre-record a binary "one," the current $I_5$ is to be induced in the direction shown in the secondary winding opposite the center tap 13 of the transformer T. $I_5$ is induced in the secondary winding in the direction shown only if the current $I_1$ flowing in the primary winding of the transformer T is of greater magnitude than $I_2$. This current arrangement is readily obtained by means of the bistable multivibrator circuit shown connected to the primary leads of the transformer T. It should be noted here that before a recording cycle takes place, the flip-flop is initially conditioned by resetting the latter with a positive pulse applied to terminal 8. In other words, the flip-flop is reset when T2 is forward biased or conducting. On the other hand, when T1 is conducting or is forward biased, the flip-flop is considered as being set. The information signal is applied to terminal 7 and since a binary "one" is to be recorded first (pre-recorded), a positive pulse is transmitted to the base 11 of the transistor T1 so that the latter becomes forwad biased and the flip-flop is set. While the flip-flop is set, the pulses A and B are applied to the respective center taps 13 and 15 in the time sequence shown (i.e. pulse A is prior in time to pulse B). Thus, by forward biasing transistor T1 with a positive pulse applied to terminal 7, the current $I_1$ is developed from center tap 13 through the diode D1, resistor R3, diode D2, the collector 20 and the emitter 24 to ground. The current $I_2$ also flows in the primary of the transformer T but is of lower magnitude since this current is conducted to the base 11 via the diode D3, resistors R4 and R2, diodes D4, D5 and D6. It is therefore apparent that the current $I_5$ is induced in the secondary of the transformer T in the direction shown because the current $I_1$ is greater than $I_2$ and because of the particular winding configuration of the transformer T, this voltage will be of positive polarity at the top terminal.

Since the second section of the bi-polar pulse is to be negative to record a binary "zero," the voltage induced in the secondary of the transformer T opposite center tap 15 must be negative. To induce a negative signal in the secondary winding, the current $I_6$ must flow in the direction shown and hence the primary current $I_3$ must be greater in magnitude than the primary current $I_4$. It should be noted that when the pulse B is applied to the center tap 15, the flip-flop is still set (T1 is conductive) and hence, the forward biased transistor T1 allows $I_3$ to flow from terminal 15, through diode D9 resistor $R_3$, diode D2 and thence, through the collector 20 and emitter 24 to ground potential. Current $I_4$ is less in magnitude than $I_3$ since the former is the drive current flowing into the base 11 via diode D7, resistors R4 and R2, diodes D4, D5 and D6. In view of the fact that the current $I_3$ is greater than $I_4$, the induced current $I_6$ in the secondary of the transformer T is in the direction shown. However, since the secondary winding opposite the center tap 15 is oppositely poled from the secondary winding opposite the center tap 13, the voltage induced is of negative polarity at the top terminal. Since the secondaries of the transformer T are wound in parallel fashion, the positive pulse produced by the current $I_5$ is followed by the negative pulse produced by the current $I_6$.

It should be understood that if the recording scheme is that of a binary "zero" followed by a binary "one," then the flip-flop will be first reset by a positive pulse applied to the reset terminal 8. On this occasion, terminal 7 will be at ground potential (no positive signal applied) and hence transistor T1 is kept non-conducting and transistor T2 conductive. The flip-flop thereby remains reset. Thereafter, the signals A and B are applied to the respective center taps 13 and 15. Current conduction through transistor T2 causes $I_5$ and $I_6$ to be reversed in the transformer secondaries and hence, a negative followed by a positive signal are induced therein.

The current produced by the bi-polar pulse composed of a positive section followed by a negative signal is transmitted to the plated wire 18 via the bi-directional current switch 12. Bi-directional current switch 12 thereby allows current to be conducted from the secondary of the transformer T to ground potential when a positive pulse is induced therein during substantially the same time period as a pulse is applied to the drive line 16 by the word driver 14. Thus, a binary "cone" is temporarily pre-recorded at the bit position 15. Current is also conducted from ground to the secondary of the transformer T when the negative signal is induced in the latter via the plated wire 18. This current conduction occurs in the plated wire substantially coincident with a pulse applied to the drive line 16 so that a binary "zero" may be written into the bit position 15.

In summary, the instant invention provides a technique to overcome history effects in plated magnetic wires which comprises temporarily pre-recording the opposite information in a certain bit position from that which is to be recorded. Thus, if a binary "zero" is to be stored at a certain bit location, a binary "one" is temporarily pre-recorded prior to recording the binary "zero." Similarly, if a binary "one" is to be written into a certain bit location, a binary "zero" is first recorded at the same bit location prior to recording the binary "one."

The embodiments of the invention in which an exclusive property or privilege is claimed are defined as follows.

1. A recording apparatus comprising: a memory element comprising a specific location on a recording medium having two states of stable magnetic remanence and adapted to be switched into either of said two states, said two states of remanence being representative of first and second recorded signals; means coupled to said memory element to record either said first or second signals by temporarily recording said first signal before finally recording said second signal and alternatively, temporarily recording said second signal before finally recording said first signal on said memory element.

2. A recording apparatus comprising: a recording medium, said recording medium having two states of stable magnetic remanence and adapted to be switched into either of said two states at any specific location along said recording medium, said two states of remanence being representative of first and second recorded signals; means coupled to said recording means to record either said first or second signals, said means pre-recording said first signal before said second signal and alternatively, pre-recording said second singal before said first signal at any said specific position along said recording medium.

3. A recording apparatus comprising: a memory element consisting of a magnetically plated wire having the property of uniaxial anisotropy and a drive line positioned substantially orthogonal and in juxtaposition to said plated wire, said memory element having two states of remanence comprising first and second recorded signals; means connected to said plated wire to generate a bi-polar signal, said bi-polar signal comprising a positive and negative portion; means connected to said drive line to generate a unipolar signal substantially coincident with said bi-polar signal in order to finally record said first or in the alternative said second signal on said memory element.

4. A recording device comprising: a memory element consisting of a magnetically plated wire having the property of uniaxial anisotropy and a drive line positioned substantially orthogonal and in juxtaposition to said plated wire, said memory element having two states of remanence comprising first and second recorded signals; means connected to said plated wire to generate a bi-polar signal, said bi-polar signal comprising first and second polarities; means connected to said drive line to generate two unipolar signals, one of said unipolar signals occurring substantially coincident with said first polarity of said bi-polar signal and said second unipolar signal occurring substantially coincident with said second polarity of said bi-polar signal in order to respectively record in succession said first and second signal on said memory element.

5. In a phase modulation recording system for a wire memory the arrangement comprising: a memory cell comprising a specific location on said wire having two states of stable magnetic remanence and adapted to be switched into either of said two states, said two states of remanence comprising first and second recorded signals; means coupled to said wire memory cell wherein either said first or second signal can be recorded in succession thereon no more than twice in recording a plurality of said first signals, or in the alternative, in recording a plurality of said second signals, or in the alternative, in recording a mixture of said first and second signals.

6. A recording apparatus comprising: a memory cell which stores first or second binary signal information; means coupled to said memory cell to record binary information wherein the recording of said first binary signal on said cell is preceded by an incomplete recording of said second binary signal and in the alternative, the recording of said second binary signal on said cell is preceded by an incomplete recording of said first binary signal.

7. In a phase modulation binary recording system for a wire memory the arrangement comprising: means for applying a bi-polar signal comprising a single positive and negative portion to said wire memory during the recording of a binary "one" or in the alternative, a binary "zero," the average D.C. current of said bi-polar signal being substantially zero so as not to store net energy in the inductance and the distributive capacitance of said wire.

8. The arrangement in accordance with claim 7 wherein said wire comprises a copper-beryllium substrate.

9. The arrangement in accordance with claim 8 wherein said substrate has a Permalloy coating comprising 80% nickel, 20% iron and a trace of cobalt.

10. The arrangement in accordance with claim 8 wherein said wire has a diameter on the order of 5 mils.

11. The arrangement in accordance with claim 7 wherein a conductive strap is positioned substantially orthogonal to said wire memory.

12. The arrangement in accordance with claim 11 wherein said strap is energized during a time period which completely overlaps the first polarity of said bipolar pulse.

13. The arrangement in accordance with claim 12 wherein said time period of said energizing pulse applied to said strap further overlaps partially the second polarity of said bi-polar pulse.

14. The arrangement in accordance with claim 11 wherein two consecutive energizing pulses are applied to said conductive strap, the first of said pulses partially overlapping the first polarity of said bi-polar pulse and the second of said pulses partially overlapping the second polarity of said bi-polar pulse.

15. In a recording system for a memory device wherein a bit location is defined as the intersection of a plated magnetic wire and a drive strap the improvement comprising: means for applying a bi-polar signal comprising a single positive and negative excursion to said wire during a recording cycle, the average D.C. current of said bi-polar signal being substantially zero, and means for applying a signal in cooperation with said bi-polar signal, binary information being recorded at said bit position wthout disturbing adjacent binary information along said plated wire.

16. The method of recording binary information on a memory cell having an Easy and Hard axis of magnetization comprising:

(a) applying to said cell a signal having a single positive and a single negative excursion whose respective magnetic fields are in the direction of said Easy axis, (b) applying to said cell a single unipolar signal whose magnetic fields are in the direction of said Hard

17. The method of recording binary information on a memory cell in accordance with claim 16 comprising:

(a) applying to said cell two unipolar signals whose magnetic fields are in the direction of said Hard axis.

18. The method of recording binary information on a memory cell comprising:

(a) writing binary information on said cell no more than twice in succession when a series of binary ones or in the alternative, a series of binary zeroes, or in the further alternative, a mixture of binary ones or zeroes are recorded thereat.

References Cited

UNITED STATES PATENTS

| | | | |
|---|---|---|---|
| 3,387,291 | 6/1968 | Pugh | 340—174 |
| 3,311,893 | 3/1967 | Landell | 340—172.5 |
| 3,278,914 | 10/1966 | Rashleigh et al. | 340—174 |
| 3,058,099 | 10/1962 | Williams | 340—174 |

JAMES W. MOFFITT, Primary Examiner